(12) United States Patent
Laaksonen

(10) Patent No.: US 12,485,768 B2
(45) Date of Patent: Dec. 2, 2025

(54) CONTROL OF TORQUE IN ELECTRIC LIFT TRUCKS

(71) Applicant: Mitsubishi Logisnext Europe Oy, Järvenpää (FI)

(72) Inventor: Janne Laaksonen, Riihimäki (FI)

(73) Assignee: Mitsubishi Logisnext Europe Oy, Järvenpää (FI)

( * ) Notice: Subject to any disclaimer, the term of this patent is extended or adjusted under 35 U.S.C. 154(b) by 287 days.

(21) Appl. No.: 17/763,884

(22) PCT Filed: Sep. 23, 2020

(86) PCT No.: PCT/FI2020/050616
§ 371 (c)(1),
(2) Date: Mar. 25, 2022

(87) PCT Pub. No.: WO2021/058864
PCT Pub. Date: Apr. 1, 2021

(65) Prior Publication Data
US 2022/0340017 A1    Oct. 27, 2022

(30) Foreign Application Priority Data

Sep. 27, 2019 (FI) ..................................... 20195825

(51) Int. Cl.
*B60L 15/20* (2006.01)
*B66F 9/075* (2006.01)

(52) U.S. Cl.
CPC .......... *B60L 15/20* (2013.01); *B66F 9/07572* (2013.01); *B60L 2200/42* (2013.01);
(Continued)

(58) Field of Classification Search
CPC .. B60L 15/20; B60L 2200/42; B60L 2240/36; B60L 2200/40; B60L 15/00; B60L 50/60; B66F 9/07572
See application file for complete search history.

(56) References Cited

U.S. PATENT DOCUMENTS 5,638,387 A * 6/1997 Palleggi ................ B66F 9/0755
318/67
9,045,045 B2   6/2015 Onodera et al.
(Continued)

FOREIGN PATENT DOCUMENTS

DE    102005033702 A1    1/2007
DE    102008021395 A1    10/2009
(Continued)

OTHER PUBLICATIONS

European Communication pursuant to Article 94(3) EPC, Application No. 20785547.9, dated Jun. 13, 2023.
(Continued)

*Primary Examiner* — Ig T An
(74) *Attorney, Agent, or Firm* — MacMillan, Sobanski & Todd, LLC

(57) ABSTRACT

The present invention relates to a method for controlling a torque generated by at least one electric motor of an electric lift truck, the method comprises: detecting a fulfilment of at least one criterion when the torque of the at least one electric motor is in a first mode, the fulfilment of the at least one criterion indicating insufficient amount of the torque in to maintain a motion of the electric lift truck, triggering an electrical drive of the at least one electric motor to generate a control signal to generate a torque being larger than the torque of the at least one electric motor in the first mode to change the torque to an increased torque mode. Some aspects relate to a control unit, to a computer program product and to an electric lift truck.

14 Claims, 3 Drawing Sheets

(52) U.S. Cl.
CPC ....... *B60L 2240/12* (2013.01); *B60L 2240/16* (2013.01); *B60L 2240/36* (2013.01); *B60L 2240/423* (2013.01); *B60L 2240/425* (2013.01); *B60L 2250/26* (2013.01); *B60L 2260/167* (2013.01); *B60L 2260/42* (2013.01)

(56) References Cited

U.S. PATENT DOCUMENTS

| | | | |
|---|---|---|---|
| 2012/0232735 A1* | 9/2012 | Hashizaka | B60L 50/51 701/22 |
| 2013/0124024 A1* | 5/2013 | Nakamura | B60L 50/51 701/22 |
| 2014/0350799 A1* | 11/2014 | Kikuyama | B60L 7/14 701/50 |
| 2015/0263662 A1 | 9/2015 | Lee | |
| 2017/0274892 A1 | 9/2017 | Miyashita et al. | |

FOREIGN PATENT DOCUMENTS

| | | | | |
|---|---|---|---|---|
| DE | 102013111638 A1 * | 4/2015 | | B50L 15/20 |
| EP | 2497679 A2 | 9/2012 | | |
| EP | 2578439 A1 | 4/2013 | | |
| JP | H0698421 | 4/1994 | | |
| JP | 2001352612 A | 12/2001 | | |
| JP | 2003267698 | 9/2003 | | |
| JP | 2015177741 | 10/2015 | | |
| JP | 2017177878 | 10/2017 | | |
| WO | 2015098166 A1 | 7/2015 | | |

OTHER PUBLICATIONS

International Search Report and Written Opinion, Application No. PCT/FI2020/050616, dated Dec. 10, 2020.

Finish Patent and Registration Office, Search Report, Application No. 20195825, dated May 5, 2020.

International Preliminary Report on Patentability, Application No. PCT/FI2020/050616, dated Jan. 3, 2022.

Written Opinion of the International Preliminary Examining Authority, Application No. PCT/FI2020/050616, dated Aug. 3, 2021.

* cited by examiner

CONTROL OF TORQUE IN ELECTRIC LIFT TRUCKS

TECHNICAL FIELD

The invention concerns in general the technical field of electric lift trucks. More particularly, the invention concerns controlling a motion of the electric lift trucks.

BACKGROUND

Electric power generation means in lift trucks, such as in counterbalance lift trucks, has been a reality for decades. Recently, a utilization of the electric motors in the lift trucks has even increased as a consequence of technical development in the areas of electric motors and batteries. Additionally, issues relating to climate change has increased a change from combustion engines to electric motors in all vehicles.

As is well-known the lift trucks are designed to carry heavy weights in the forks. The lift trucks also operate in wide range of environments having flat areas but also slanted areas, such as ramps along which the lift trucks need to travel with or without a load. Additionally, the lift trucks may operate 24 hours in 7 days.

The described operating conditions bring a lot of challenges to design the lift trucks. For example, the traditional power generation means based on combustion engines causes a lot of loss in a form of heat which needs to be compensated to protect the combustion motor from damages. The compensation to heat is achieved by implementing an efficient liquid cooling system in the lift trucks utilizing the combustion engines.

As it comes to lift trucks based on electric motors their energy efficiency compared to the lift trucks having the combustion engine is much better and, hence, they do not require liquid cooling system, for example. However, the challenge in using the electric motors as power generating means in lift trucks is that they have clearly lower torque efficiency at higher operating speeds of the motor compared to combustion engines. The lower torque efficiency may already be seen from ⅓ operating speed range onwards. In practice, this may cause challenges e.g. in situations in which the lift truck carries a heavy load upwards in a ramp. The speed of the lift truck may remarkably slow down or even stop.

Hence, there is need to mitigate the challenges when applying electric motors in the lift trucks and develop solutions to solve, at least in part, the described challenges.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An object of the invention is to present a method, a control unit, a computer program product and a lift truck for controlling a torque of a lift truck.

The objects of the invention are reached by a method, a control unit, a computer program product and a lift truck as defined by the respective independent claims.

According to a first aspect, a method for controlling a torque generated by at least one electric motor of an electric lift truck is provided, the method comprises: detecting a fulfilment of at least one criterion when the torque of the at least one electric motor is in a first mode, the fulfilment of the at least one criterion indicating insufficient amount of the torque in the first mode to maintain a motion of the electric lift truck; triggering an electrical drive of the at least one electric motor to generate a control signal to the at least one electric motor to generate a torque being larger than the torque of the at least one electric motor in the first mode to change the torque to an increased torque mode for maintaining the motion of the electric lift truck.

A detection of the fulfilment of the at least one criterion indicating insufficient amount of the torque in the first mode may be performed on a basis of at least one of the following: an interaction performed by a user of the lift truck; a change in a motion of the lift truck. For example, the detection based on the interaction by a user of the lift truck may be performed by detecting that a position of an acceleration pedal is changed over a predefined triggering limit. Alternatively or in addition, the detection based on the change in the motion of the lift truck may be performed by detecting that a speed of the electric truck deviates from a target speed over a predefined limit in the first mode. Still further, the detection based on the change in the motion of the lift truck may be performed by detecting that an acceleration of the electric truck changes over a predetermined limit in the first mode.

A plurality of increased torque modes may be predefined among which an increased torque mode is selected in accordance with the at least one criterion based on which the detection is performed.

For example, the increased torque mode may be maintained continuously active for a predefined duration of time.

The increased torque mode may be inactivated in response to a detection that a temperature exceeds a predefined limit in at least one of the following: the at least one electric motor; at least one electrical drive.

According to a second aspect, a control unit for controlling a torque generated by at least one electric motor of an electric lift truck is provided, the control unit comprising: at least one processor; and at least one memory including computer program code; the at least one memory and the computer program code configured to, with the at least one processor, cause the control unit to: detect a fulfilment of at least one criterion when the torque of the at least one electric motor is in a first mode, the fulfilment of the at least one criterion indicating insufficient amount of the torque in the first mode to maintain a motion of the electric lift truck; trigger an electrical drive of the at least one electric motor to generate a control signal to the at least one electric motor to generate a torque being larger than the torque of the at least one electric motor in the first mode to change the torque to an increased torque mode for maintaining the motion of the electric lift truck.

The control unit may be arranged to perform a detection of the fulfilment of the at least one criterion indicating insufficient amount of the torque in the first mode on a basis of at least one of the following: an interaction performed by a user of the lift truck; a change in a motion of the lift truck. For example, the control unit may be arranged to perform the detection based on the interaction by a user of the lift truck by detecting that a position of an acceleration pedal is changed over a predefined triggering limit. Alternatively or in addition, the control unit may be arranged to perform the detection based on the change in the motion of the lift truck by detecting that a speed of the electric truck deviates from a target speed over a predefined limit in the first mode. Further, the control unit may be arranged to perform the detection based on the change in the motion of the lift truck by detecting that an acceleration of the electric truck changes over a predetermined limit in the first mode.

The control unit may be arranged to select an increased torque mode among a plurality of predefined increased torque modes in accordance with the at least one criterion based on which the detection is performed.

The control unit may also be arranged to instruct to maintain the increased torque mode continuously active for a predefined duration of time.

The control unit may be arranged to instruct to inactivate the increased torque mode in response to a detection that a temperature exceeds a predefined limit in at least one of the following: the at least one electric motor; at least one electrical drive.

According to a third aspect, a computer program product for controlling a torque generated by at least one electric motor of an electric lift truck is provided which, when executed by at least one processor, cause a control unit of the electric lift truck to perform the method according to the first aspect above.

According to a fourth aspect, an electric lift truck is provided, the electric lift truck comprising: an electric motor; an electrical drive; and a control unit according to the second aspect above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
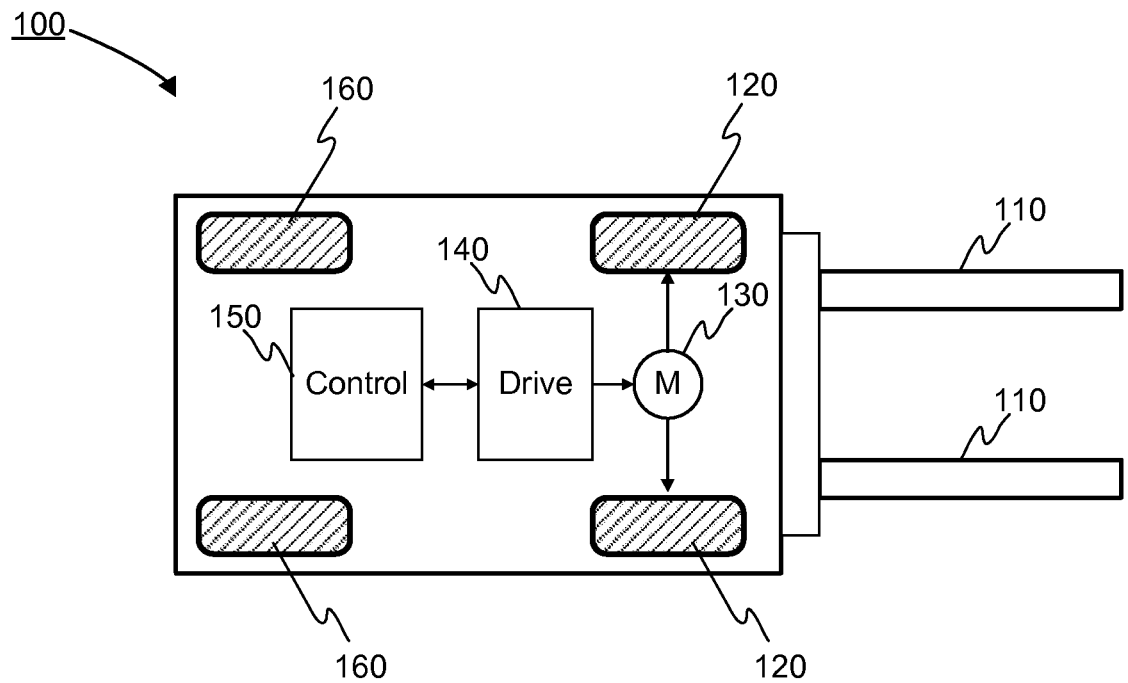
FIG. 1 illustrates schematically a lift truck according to an example embodiment.

FIG. 1 illustrates schematically a lift truck 100, such as a counterbalance truck, according to an example embodiment of the present invention. The lift truck 100 may comprise a lifting mechanism, such as a fork tool 110, in a first side, i.e. here in a front-side, of the lift truck 100. The lift truck 100 may further comprise one or more driving wheels 120, positioned e.g. in the first side, into which a torque is generated by one or more electric motors 130. The at least one motor 130 may be controlled with electrical drive 140 arranged to generate control signals to the electric motor in accordance with control received from a control unit 150. The control signals generated by the electrical drive 140 may e.g. refer to drive signals generated for the at least one electric motor 130, such as an AC signal generated with converter circuit in the electrical drive 140. The control signals from the control unit 150 to the electrical drive 140 may be conveyed e.g. over a data bus communicatively connecting the mentioned entities. As a non-limiting example of a control signal from the control unit 150 to the electrical drive 140 may be a target speed of the lift truck 100. The control unit 150 itself may be a controller having an overall responsibility of a control of the lift truck 100 or it may be a dedicated control unit 150 to perform a method as is described in the forthcoming description. For sake of clarity the control unit 150 may reside conceptually in the electrical drive 140 or external to that, and arranged to generate control signals to corresponding switches, or switching circuit(s), in the electrical drive 140 e.g. to generate the AC signal from a DC signal received from a battery of the lift truck 100. Moreover, conceptually thinking the at least one electric motor 130 may be considered to belong to the electrical drive 140.

Still further, the lift truck 100 may comprise one or more steered wheels 160 e.g. in a back-side of a chassis of the lift truck 100 as schematically illustrated in FIG. 1. The steered wheels 160 may be controlled with a steering system comprising a steering device, such as a wheel, and a steering shaft among other elements. As already mentioned, the lift truck 100 also comprises a battery suitable to store energy from which it is possible generate applicable drive signals, such as AC voltages, to the at least one motor 130. Still further, the lift truck 100 comprises one or more means for implementing user interface with a driver of the truck, such as buttons, light indicators, display devices and any similar. The user interface may also comprise pedals controllable with limbs of the driver, wherein the pedal may provide a mechanism to control braking system and torque of the electric motor either directly or indirectly. Naturally, the lift truck 100 comprises further elements not illustrated in FIG. 1 or not referred to above.

Figure 2:
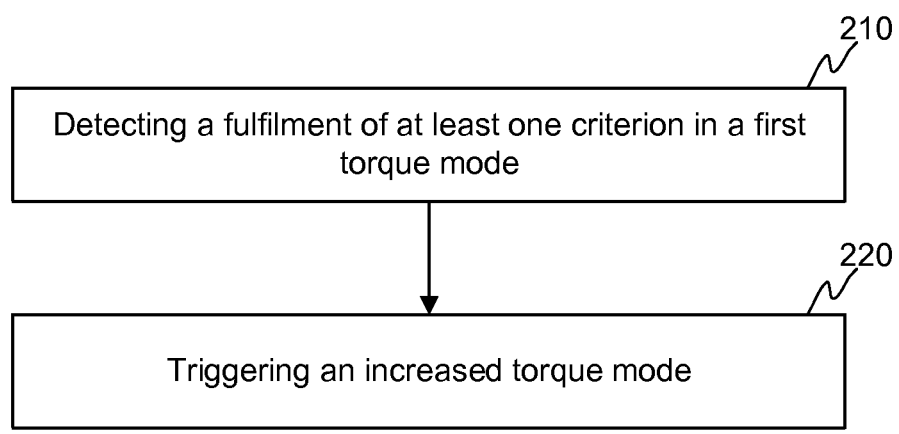
FIG. 2 illustrates schematically a method according to an example embodiment.

Some aspects of the present invention are now discussed by referring to FIG. 2 illustrating schematically a method according to an example embodiment. Here, the lift truck 100 is on motion i.e. a torque is generated to the driving wheels 120 by the at least one electric motor 130. The torque may be determined by the electrical drive 140 in accordance with the control signal e.g. indicating a target speed of the lift truck 100 received from the control unit 150. For example, the control unit 150 may be arranged to generate the control signal in accordance with a control operation received from the driver of the lift truck 100 through at least one device belonging to the user interface. For example, the control operation may refer to controlling of an accelerator pedal of the lift truck 100.

In accordance with the example embodiment of the method it may be detected 210, by the control unit 150, a fulfilment of at least one criterion when the torque of the at least one electric motor is in a first mode. The first mode may e.g. refer to a situation that the electrical motor 130 is caused to generate a nominal torque by controlling it. The nominal torque may be understood as the torque the electric motor is designed to provide in a normal operating situation. The nominal torque is typically stated in the motor's type plate. As said, the nominal torque is a result of a design of the motor, wherein the design is usually done in accordance with a standard set for the electric motors, such as IEC-34 standard. For example, the design of the electric motor may be done may e.g. be done by applying the short time duty (S2) cycle of the IEC-34 standard in the design. Other approaches in the design may naturally be applied to. Hence, the fulfilment of the at least one criterion corresponds to a situation in which the nominal torque is not sufficient to maintain a motion of the electric truck as expected in the first mode. In other words, the electric motor 130 may generate insufficient amount of the torque in the first mode to maintain a motion of the electric lift truck. The motion of the electric lift truck may be monitored by monitoring a value representing a speed of the lift truck or by monitoring the torque curve of a motor control. As mentioned in the normal mode the control unit 150 may provide a target speed to the electrical drive 140 and the electrical drive 140 may be configured to generate control to the electric motor 130 for achieving the lift truck 100 to move at the target speed. Now, at some situation it may be detected that the motor 130 of the lift truck 100 is not able to generate a torque maintaining the target speed and the speed of the lift truck 100 decreases. This may e.g. occur when the lift truck 100 travels uphill or upwards in ramp e.g. with a heavy load or if the lift truck 100 carrying the heavy load enters a surface having a low road resistance from a surface having a high road resistance. For example, the control unit 150 may receive a signal in a real-time from an entity suitable for providing a signal representing the speed of the lift truck 100 preferably in real-time. Such an entity may e.g. be a sensor, such as a Hall sensor, sensor bearing or an optical sensor, arranged to measure a rotational speed of the electric motor 130 or any other entity, such as at least one of the wheels 120, 160, so that the speed of the lift truck 100 may be determined. More specifically, the rotational speed of the electric motor 130 may be measured by applying a Hall encoder for reading pulses from a pickup ring installed to a motor shaft or by applying a sensor bearing installed inside the motor. Naturally, solutions based on separate sensors may also be applied to, such as an external or an embedded incremental encoder connected to the motor 130 or a gearbox, an external or an embedded absolute encoder connected to the motor 130 or to the gearbox. Any other measurement methods and/or devices may be used for determining the rotational speed of the motor 130 either directly or indirectly.

In accordance with the present invention the detection of the fulfilment of the at least one criterion in the first mode of the torque may be performed so that it is set a maximum deviation value between the target speed and the actual speed of the lift truck 100 which generates a detection indicating insufficient amount of the torque generated by the electric motor 130 in the first mode to maintain a motion of the lift truck 100. For example, an allowable deviation may be set to 10%. In some other example embodiments the monitoring of the criterion, and a state of the motion of the lift truck 100 may be based on an acceleration. For example, the criterion may be set so that an allowable acceleration, such as deceleration, value may be set and an acceleration of the lift truck 100 is determined e.g. on a basis of a sensor value or it is derived from speed values. Correspondingly, the detection may then be performed if the lift truck 100 decelerates more than allowed in a predefined time window. Moreover, it may also be possible to detect the need for increased torque by monitoring the actual torque of a motor control. If needed torque reaches the nominal torque curve, control system may be arranged to detect this and change to increased torque curve proportionally.

In the foregoing description it is provided non-limiting examples how the detection if the criterion is fulfilled or not may be performed. In the examples the criterion is related to monitoring of one or more parameters representing the motion of the lift truck 100. Alternatively or in addition, the criterion may be to be related to user's, such as the driver's, interactions through the user interface of the lift truck 100. For example, according to an example embodiment an operation of the acceleration pedal may be monitored. In this embodiment the detection of insufficient amount of the torque in the first mode may be performed by detecting that a position, such as an angle, of the acceleration pedal changes, e.g. in a stepwise manner, over a predetermined triggering limit. Alternatively or in addition, the detection of the position of the acceleration pedal may be based on a detection that the acceleration pedal is pushed into an extreme position. The detection may e.g. be based on a signal received from a sensor, such as from an applicable switch, arranged to detect that the pedal is in the extreme position. The detection in at least the above described manner shall be considered as a driver initiated detection in which action taken by the driver indicates that the torque in the first mode is insufficient, which may automatically cause the triggering of the increased torque mode.

In response to the detection in step 210 an electrical drive 140 of the at least one electric motor 130 may be triggered 220 to generate a control signal to the at least one electric motor 130. The triggering may be performed by the control unit 150 by instructing the electric motor 130 to generate a torque being larger than the torque of the at least one electric motor 130 in the first mode to change the torque to an increased torque mode for maintaining the motion of the electric lift truck 100. As mentioned in the foregoing description the torque in the first mode may refer to a torque in the nominal operating state of the electric motor 130 whereas the increased torque mode may refer to a so-called boost state in which the electric motor 130 is controlled to generate a torque exceeding the nominal operating state of the electric motor 130 in order to maintain the motion of the lift truck 100.

For sake of clarity, it may be worthwhile to mention that a type of the instructions generated by the control unit 150 for achieving an increased torque with respect to the normal state, i.e. the first mode, may vary. According to a first example embodiment the instruction may comprise a target speed and in response to a detection that the target speed cannot be reached, or maintained, the control unit 150 generates an instruction to with respect to change the torque, such as the applied torque curve, as is discussed in a forthcoming description. According to another example embodiment the instruction may comprise data indicating that the driver has performed at least one predetermined action requesting triggering of the increased torque mode. Any other data indicating the request for the increased torque mode may naturally be carried. Moreover, the instruction may also comprise additional data, such as data indicating a time frame the increased torque mode may be applied to. The electrical drive 140 may, according to various example embodiments, maintain data defined different torque modes, such as torque curves for different situations. Additionally, the electrical drive 140 may comprise an operational logic for changing between the torque curves in a continuous manner. Still further, the electrical drive 140 may be arranged to monitor the torque, such as need for changing the torque curve during the operation of the lift truck 100. For example, the electrical drive 140 may be arranged to generate a feedback signal to the control unit 150 indicating the status of the torque, wherein the control unit may then generate the instruction as described above, for example.

Figure 3:
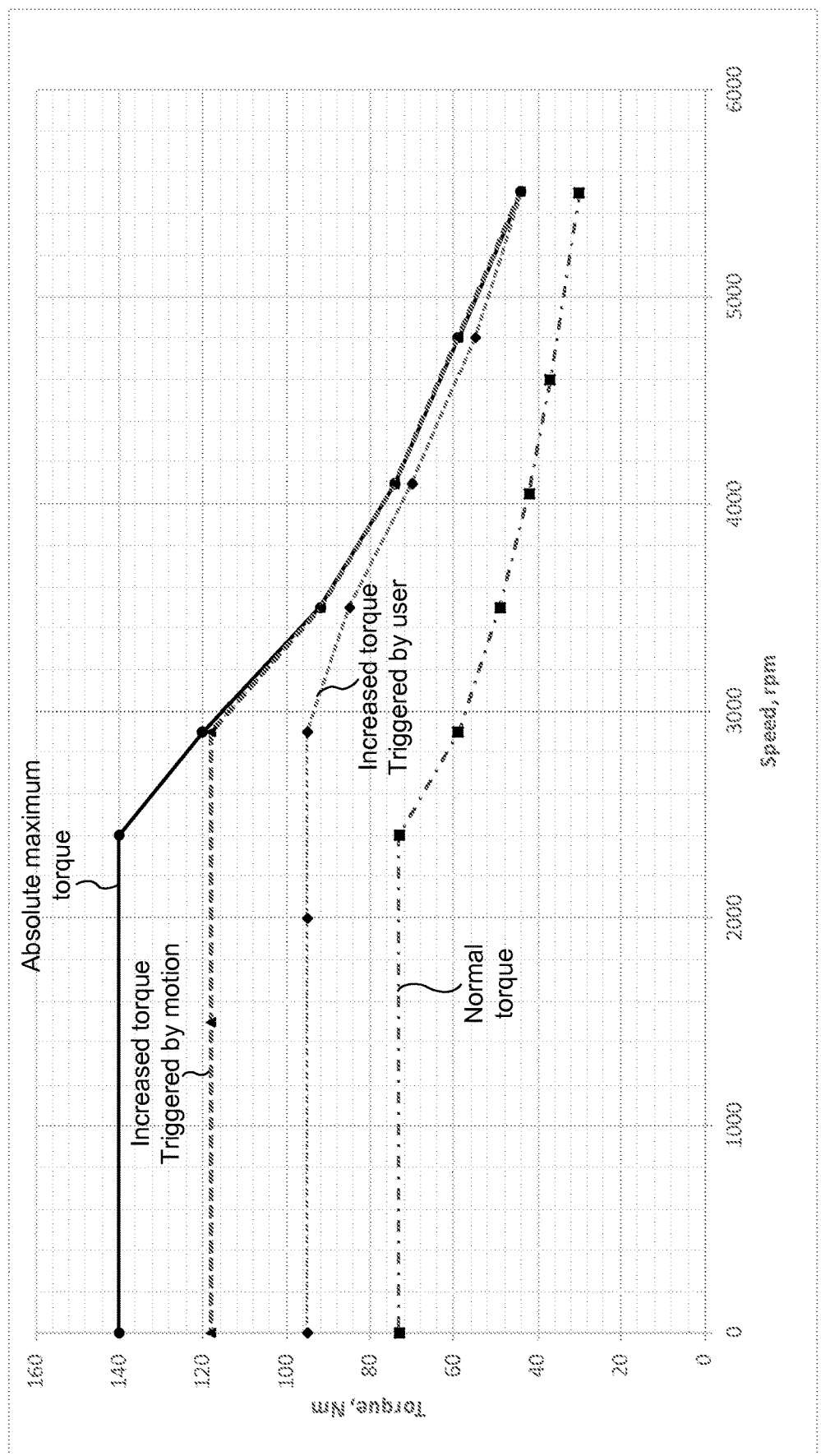
FIG. 3 illustrates schematically torque curves applicable in an example embodiment.

According to various example embodiments the method may be implemented so that there is a plurality of increased torque modes to be applied in accordance with different triggering rules. Such an arrangement is schematically illustrated in FIG. 3. FIG. 3 illustrates schematically a torque in relation to speed of the electric motor in rpm. The lowest curve may be an example of the torque curve in a so-called normal mode i.e. in the first mode. In other words, the control of the electric motor 130 may be performed in accordance with the curve so as to generate a corresponding torque at a certain speed of rotation of the motor 130. In addition to the normal mode the electric motor 130 may be arranged to provide torque in accordance with two increased torque modes which are selected in accordance with the triggering of the increased torque mode. A first increased torque mode triggered by user action may be such that it provides a moderate additional torque compare to the first mode. A second increased torque mode, in turn, may be triggered by monitoring the motion of the lift truck 100, such as the speed or acceleration, as described and if it is triggered, the torque curve is higher than the torque curve triggered due to user action. In addition to these, there may be defined an absolute maximum torque for the electric motor which is not allowed to be exceeded under any circumstances in order to protect the entities of the lift truck 100. As mentioned, the selection between the applied torque curves, or profiles, may be selected in accordance with fulfilment of one or more criteria set for causing a detection.

The above described increased torque mode may be achieved by designing the electric motor 130, but also the electrical drive 140 so that the increased torque may be achieved. According to example embodiment the increased torque mode may refer to an implementation in which the electrical drive 140 is designed to tolerate an increased current provision capability of 20%-30% to the nominal drive mode i.e. the first mode. In practice, the electrical drive 140 may be designed e.g. by doubling switching elements in the electrical drive 140 but also selecting components in the power circuit to tolerate increased current level during the increased torque mode. In addition, the electric motor 130 may be designed so that a number of turns in the coil winding in the electric motor 130 is decreased in order to match with the electrical drive 140 suitable for providing the increased current level to the electric motor 140. The designing of the electric motor 130 and the electrical drive 140 and their mutual matching enables that the increased torque mode may be generated at least in a temporal basis. In accordance with at least some embodiments by assuming that the increased torque mode may be maintained in temporally, it is possible to utilize, by modifying as described, electric motors 130 and electrical drives 140 having the same physical size as with the lift trucks 100 being capable of operating only in the normal mode. In various embodiments the increased torque mode may be addressed with aspects relating to cooling. Especially, this may refer to cooling of components of the electrical drive 140 in accordance with the capability to provide increased current to the electric motor 130. The cooling may be arranged so that the cooling air may be guided from the electrical drive 140 further to the at least one electric motor 130 to achieve an overall reduction of entities being involved in the increased torque mode. For example, one or more guide elements may be arranged in the lift truck 100 to guide the air between the mentioned entities in the manner as described. With the described design the electric motor 130 is achieved to operate in higher rotational speed range even in the first mode and, thus, maintain the torque high also then.

The control unit 150 may be arranged to monitor the increased torque mode in a number of ways. For example, it may be defined a number of rules which shall be fulfilled by the increased torque mode. According to an example embodiment it may be defined a maximum duration the increased torque mode is allowed to be continuously active. Alternatively or in addition, another rule may relate to an aspect of a residual time of a single increased torque mode session to a maximum time of the increased torque mode. Still further, a rule may be set to define a minimum interval between activated increased torque modes. Additionally, a temperature of at least one electric motor 130 and/or an electrical drive 140 may be monitored and one or more rules may be set with respect to the temperature(s), such as if the temperature deviates, such as exceeds, from a predefined limit, the increased torque mode shall be inactivated All of these rules may be individual for accelerator pedal triggered function, and for the motion speed triggered function. An outmost aim is to maintain the lift truck 100 fit for the service i.e. to protect the lift truck 100 to get broken especially due to increased torque mode in which the components of the power generation means may be considered as overloaded in the temporal manner.

An attention shall also be given to a situation in which the increased torque mode is to be deactivated. The deactivation may be performed in proportionally to reach a smooth deactivation of the increased torque mode so that the user of the lift truck 100 does not even notice it, get irritated, or even injured. The proportional deactivation of the increased torque mode may be arranged so that the control unit 150 is arranged to modify the control signal causing the increased torque mode so that the electrical drive 140 generates a proportional reducing current to the at least one electrical motor 130. This causes a controlled deactivation of the increased torque mode e.g. back to normal mode, or even to stop the lift truck 100 if desired by the user. Naturally, in some example embodiments of the present invention an activation of the increased torque mode may be arranged to be activated in proportionally to avoid any issues corresponding to the deactivation e.g. with the user of the lift truck 100.

Figure 4:
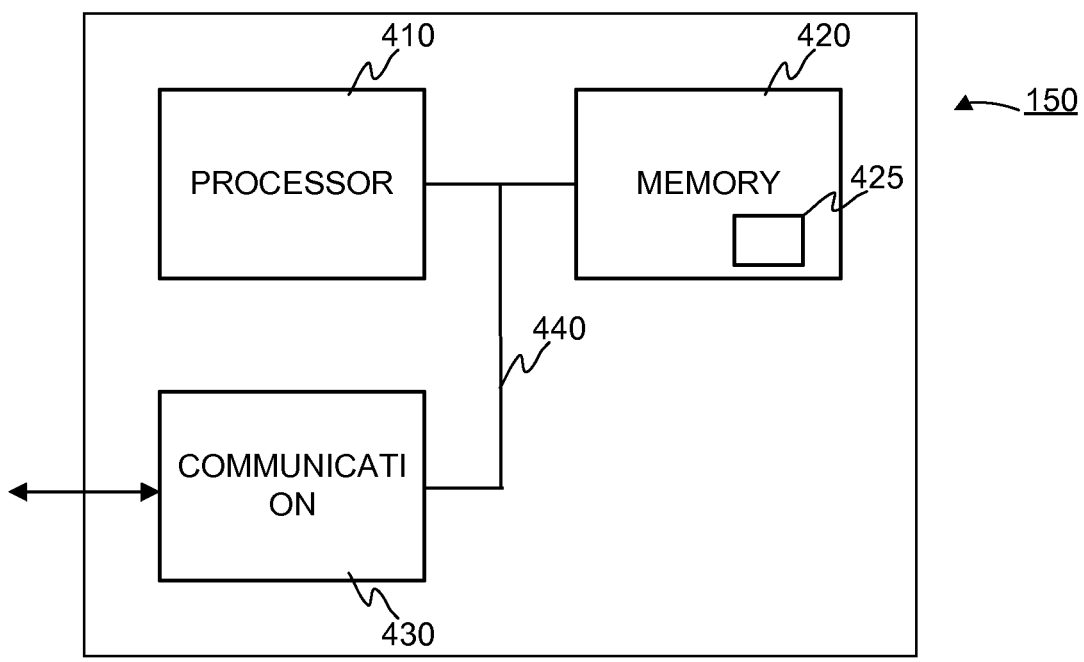
FIG. 4 illustrates schematically a control unit according to an example embodiment.

As discussed above, the lift truck 100 may comprise a control unit 150 for performing the method according to at least some example embodiments of the invention. FIG. 4 illustrates schematically as a block diagram an example of the control unit 150 applicable in the in the lift truck 100. The block diagram of FIG. 4 depicts some components of an apparatus that may be employed to implement the control unit 150. The apparatus comprises a processor 410 and a memory 420. The memory 420 may store data and computer program code 425. The apparatus may further comprise communication means 430 for wired or wireless communication with other apparatuses, such as with the electrical drive 140, and other entities of the lift truck 100, such as I/O components providing e.g. a user interface with the user of the lift truck 100 and any sensor device e.g. being involved in measuring the speed of the lift truck 100. The components of the apparatus may be communicatively coupled to each other via a bus 440 that enables transfer of data and control information between the components.

The memory 420 and a portion of the computer program code 425 stored therein may be further arranged, with the processor 410, to cause the apparatus, i.e. the control unit 150, to perform a method as described herein. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method as described when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform the method will be described. Hence, the apparatus may comprise at least one processor 410 and at least one memory 420 including the computer program code 425 for one or more programs, the at least one memory 420 and the computer program code 425 configured to, with the at least one processor 410, cause the apparatus to perform the method as described.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 425 may comprise a proprietary application, such as computer program code for controlling the torque. The proprietary application may be a client application of a service whose server application is running on a server apparatus of the system e.g. in a situation where the lift truck is at least in part controlled externally to the lift truck 100. The proprietary application may e.g. detect a fulfilment of one or more criteria in the first mode of the electric motor 130 and to trigger to change to an increased torque mode, for example.

Any of the programmed functions mentioned may also be performed in firmware or hardware adapted to or programmed to perform the necessary tasks.

Some aspects of the present invention may refer to a lift truck 100 implementing the method as described utilizing at least a control unit 150, an electrical drive 140 and at least one electric motor 130 in the manner as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for controlling a torque generated by at least one electric motor of an electric lift truck, the method performed by a control unit of the electric lift truck, comprises:
    detecting a fulfilment of at least one criterion when the torque of the at least one electric motor is in a first mode corresponding to a mode in which the at least one electric motor is caused to generate a nominal torque of the at least one electric motor, the control unit defining a target speed of the electric lift truck and a maximum speed deviation in conjunction with the detection of the fulfilment of the at least one criterion, a detection of the fulfilment of the at least one criterion indicating insufficient amount of the torque in the first mode to maintain a motion of the electric lift truck being performed on a basis of a change in the motion of the electric lift truck, the at least one criterion comprising an input to the control unit of one of an actual speed value of the electric lift truck or an actual acceleration value of the electric lift truck,
    determining a current output to increase the actual speed of the electric lift truck to the target speed automatically without a user interaction through a user interface of the electric lift truck, and operating an electrical drive of the at least one electric motor to generate a control signal to the at least one electric motor to generate, in a temporal basis, a torque being larger than the torque of the at least one electric motor in the first mode to change the torque to an increased torque mode for maintaining the motion of the electric lift truck.

2. The method of claim 1, wherein the detection based on the change in the motion of the lift truck is performed by detecting that a speed of the electric truck deviates from a target speed over a predefined limit in the first mode.

3. The method of claim 1, wherein the detection based on the change in the motion of the lift truck is performed by detecting that an acceleration of the electric truck changes over a predetermined limit in the first mode.

4. The method of claim 1, wherein a plurality of increased torque modes is predefined among which an increased torque mode is selected in accordance with the at least one criterion based on which the detection is performed.

5. The method of claim 1, wherein the increased torque mode is maintained continuously active for a predefined duration of time.

6. The method of claim 1, wherein the increased torque mode is inactivated in response to a detection that a temperature exceeds a predefined limit in at least one of the following: the at least one electric motor; at least one electrical drive.

7. A control unit for controlling a torque generated by at least one electric motor of an electric lift truck, the control unit comprising:
    at least one processor; and
    at least one memory including computer program code;
    the at least one memory and the computer program code configured to, with the at least one processor, define a target speed of the electric lift truck and a maximum speed deviation speed, and further cause the control unit to:

detect a fulfilment of at least one criterion when the torque of the at least one electric motor is in a first mode corresponding to a mode in which the at least one electric motor is caused to generate a nominal torque of the at least one electric motor, the at least one criterion comprising an input to the control unit of one of an actual speed value of the electric lift truck or an actual acceleration value of the electric lift truck, and wherein the target speed and maximum speed deviation are determined in conjunction with a detection of the fulfilment of the at least one criterion indicating insufficient amount of the torque in the first mode to maintain a motion of the electric lift truck being performed on a basis of a change in the motion of the electric lift truck, determining a current output to increase the actual speed of the electric lift truck to the target speed automatically without a user interaction through a user interface of the electric lift truck, and operating an electrical drive of the at least one electric motor to generate a control signal to the at least one electric motor to generate, in a temporal basis, a torque being larger than the torque of the at least one electric motor in the first mode to change the torque to an increased torque mode for maintaining the motion of the electric lift truck.

8. The control unit of claim 7, wherein the control unit is arranged to perform the detection based on the change in the motion of the lift truck by detecting that a speed of the electric truck deviates from a target speed over a predefined limit in the first mode.

9. The control unit of claim 7, wherein the control unit is arranged to perform the detection based on the change in the motion of the lift truck by detecting that an acceleration of the electric truck changes over a predetermined limit in the first mode.

10. The control unit of claim 7, wherein the control unit is arranged to select an increased torque mode among a plurality of predefined increased torque modes in accordance with the at least one criterion based on which the detection is performed.

11. The control unit of claim 7, wherein the control unit is arranged to instruct to maintain the increased torque mode continuously active for a predefined duration of time.

12. The control unit of claim 7, wherein the control unit is arranged to instruct to inactivate the increased torque mode in response to a detection that a temperature exceeds a predefined limit in at least one of the following: the at least one electric motor; at least one electrical drive.

13. A non-transitory computer-readable medium on which is stored a computer program comprising computer readable program code for controlling a torque generated by at least one electric motor of an electric lift truck which, when the program code is executed by at least one processor, cause a control unit of the electric lift truck to perform the method comprising:

detecting a fulfilment of at least one criterion when the torque of the at least one electric motor is in a first mode corresponding to a mode in which the at least one electric motor is caused to generate a nominal torque of the at least one electric motor, a detection of the fulfilment of the at least one criterion indicating insufficient amount of the torque in the first mode to maintain a motion of the electric lift truck being performed on a basis of a change in the motion of the electric lift truck, the at least one criterion comprising an input to the control unit of one of an actual speed value of the electric lift truck or an actual acceleration value of the electric lift truck, in conjunction with the detection of the fulfilment of the at least one criterion, defining a target speed and a maximum speed deviation, determining a current output to increase the actual speed of the electric lift truck to the target speed automatically without a user interaction through a user interface of the electric lift truck, and operating an electrical drive of the at least one electric motor to generate a control signal to the at least one electric motor to generate, in a temporal basis, a torque being larger than the torque of the at least one electric motor in the first mode to change the torque to an increased torque mode for maintaining the motion of the electric lift truck.

14. An electric lift truck comprising:
an electric motor,
an electrical drive, and
a control unit comprising:
at least one processor; and
at least one memory including computer program code;
the at least one memory and the computer program code configured to, with the at least one processor, cause the control unit to:

detect a fulfilment of at least one criterion when the torque of the at least one electric motor is in a first mode corresponding to a mode in which the at least one electric motor is caused to generate a nominal torque of the at least one electric motor, a detection of the fulfilment of the at least one criterion indicating insufficient amount of the torque in the first mode to maintain a motion of the electric lift truck being performed on a basis of a change in the motion of the electric lift truck, the at least one criterion comprising an input to the control unit of one of an actual speed value of the electric lift truck or an actual acceleration value of the electric lift truck, define a target speed and a maximum speed deviation in conjunction with the detection of the fulfilment of the at least one criterion; and determining a current output to increase the actual speed of the electric lift truck to the target speed automatically without a user interaction through a user interface of the electric lift truck, and operate an electrical drive of the at least one electric motor to generate a control signal to the at least one electric motor to generate, in a temporal basis, a torque being larger than the torque of the at least one electric motor in the first mode to change the torque to an increased torque mode for maintaining the motion of the electric lift truck.

* * * * *